US012782853B2

(12) United States Patent
Shimomura et al.

(10) Patent No.: US 12,782,853 B2
(45) Date of Patent: Nov. 3, 2026

(54) IMAGE FORMING APPARATUS INCLUDING BELT UNIT AND DOOR UNIT SUPPORTING THE BELT UNIT

(71) Applicant: CANON KABUSHIKI KAISHA, Tokyo (JP)

(72) Inventors: Masaki Shimomura, Shizuoka (JP); Hiroyuki Kadowaki, Kanagawa (JP); Tomonori Shida, Shizuoka (JP); Yoji Misao, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/076,264

(22) Filed: Mar. 11, 2025

(65) Prior Publication Data

US 2025/0291278 A1 Sep. 18, 2025

(30) Foreign Application Priority Data

Mar. 12, 2024 (JP) ................................ 2024-037806

(51) Int. Cl.
*G03G 15/00* (2006.01)
*G03G 15/16* (2006.01)
*G03G 21/16* (2006.01)

(52) U.S. Cl.
CPC ......... *G03G 15/161* (2013.01); *G03G 15/751* (2013.01); *G03G 21/1633* (2013.01); *G03G 21/168* (2013.01); *G03G 2221/1869* (2013.01)

(58) Field of Classification Search
CPC .... G03G 15/161; G03G 15/751; G03G 21/16; G03G 21/1604; G03G 21/1623; G03G 21/1633; G03G 21/168; G03G 2221/1869
See application file for complete search history.

(56) References Cited

U.S. PATENT DOCUMENTS

2004/0085431 A1 5/2004 Asuwa
2006/0067732 A1 3/2006 Igarashi
2006/0280533 A1* 12/2006 Ozawa ............... G03G 21/1633 399/361
2008/0101810 A1* 5/2008 Morimoto .......... G03G 21/1832 399/51
2008/0240780 A1* 10/2008 Yamauchi ............ G03G 21/168 399/121

(Continued)

FOREIGN PATENT DOCUMENTS

JP 2004206071 A 7/2004
JP 2005148411 A 6/2005

(Continued)

*Primary Examiner* — Sophia S Chen
(74) *Attorney, Agent, or Firm* — Canon U.S.A., Inc. IP Division

(57) ABSTRACT

An image forming apparatus includes a main body having an opening and housing a photosensitive drum, a door unit connected to the main body and movable between a closed position where it closes the opening and an open position where it opens the opening, and a belt unit including a belt configured to contact with the photosensitive drum. The belt unit is moveable between inside and outside of the main body through the opening of the main body with the door unit being in the open position. When the belt unit is outside of the main body, an upper end of the belt is positioned lower than an upper end of the door unit in a vertical direction.

15 Claims, 10 Drawing Sheets

(56) References Cited

U.S. PATENT DOCUMENTS

| | | | | |
|---|---|---|---|---|
| 2010/0239271 | A1* | 9/2010 | Kawamura | G03G 21/1623 399/21 |
| 2024/0085849 | A1* | 3/2024 | Imaizumi | G03G 21/168 |

FOREIGN PATENT DOCUMENTS

| | | | |
|---|---|---|---|
| JP | 2006267620 | A | 10/2006 |
| JP | 2009265190 | A | 11/2009 |
| JP | 2010244018 | A | 10/2010 |
| JP | 2015206897 | A | 11/2015 |

* cited by examiner

IMAGE FORMING APPARATUS INCLUDING BELT UNIT AND DOOR UNIT SUPPORTING THE BELT UNIT

BACKGROUND

Field

The present disclosure relates to an image forming apparatus.

Description of the Related Art

Some image forming apparatuses, such as printers, copiers, and multifunction printers, have a removably mounted transfer unit. In some apparatuses, not only the transfer unit but also cartridges are removably mounted on a tray that moves between inside and outside of the image forming apparatus.

Japanese Patent Application Publication No. 2010-244018 discloses an image forming apparatus having a tray with removably mounted cartridges and a fixing apparatus. The tray can be moved out of the main body of the image forming apparatus through a plurality of openings.

Japanese Patent Application Publication No. 2015-206897 discloses an image forming apparatus having a tray with removably mounted cartridges, a transfer unit, and a fixing apparatus. The tray and the transfer unit described in Japanese Patent Application Publication No. 2015-206897 are movable from inside to outside of the image forming apparatus. More specifically, the fixing apparatus is disposed at one end of the main body of the image forming apparatus. When the transfer unit moves to the outside of the main body, the transfer unit moves from the other end toward one end of the main body. When the tray moves to the outside of the main body, the tray moves from one end toward the other end of the main body.

SUMMARY

In configurations where not only a cartridge tray but also a transfer unit are allowed to be pulled out of the image forming apparatus, there is a possibility that the user accidentally touches the components in the transfer unit (typically, a transfer member such as an intermediate transfer belt or an electrostatic transfer belt). Such accidental contact by the user can contaminate the components and lead to troubles, and therefore should preferably be prevented.

The present disclosure is directed to preventing contamination of components in an image forming apparatus equipped with a pull-out transfer unit.

The present disclosure provides an image forming apparatus including a main body having an opening and configured to house a photosensitive drum; a door unit connected to the main body and configured to be movable between a closed position where the door unit closes the opening and an open position where the door unit opens the opening; a belt unit including a belt configured to contact with the photosensitive drum, the belt unit being configured to be moveable between inside and outside of the main body through the opening of the main body with the door unit being in the open position; and a tray unit configured to be moveable between inside and outside of the main body through the opening of the main body with the door unit being in the open position. The tray unit includes a cartridge and a tray on which the cartridge is removably mounted. One of the cartridge or the tray has the photosensitive drum. The door unit, when in the open position, is configured to support the belt unit located outside of the main body, and when the belt unit is outside of the main body, an upper end of the belt is positioned lower than an upper end of the door unit in a vertical direction.

According to the present disclosure, contamination of components in an image forming apparatus with a pull-out transfer unit can be prevented.

Further features of the present disclosure will become apparent from the following description of exemplary embodiments with reference to the attached drawings.

DESCRIPTION OF THE EMBODIMENTS

Hereinafter, modes for carrying out this disclosure will be illustratively described in detail based on some embodiments with reference to the drawings. It should be noted that the sizes, materials, shapes, and relative arrangement of constituent components described in the embodiments should be altered suitably in accordance with the configuration and various conditions of an apparatus to which the present disclosure is applied. Namely, the following embodiments are not intended to limit the scope of the disclosure.

Embodiment 1

Overall Configuration

Figure 1:
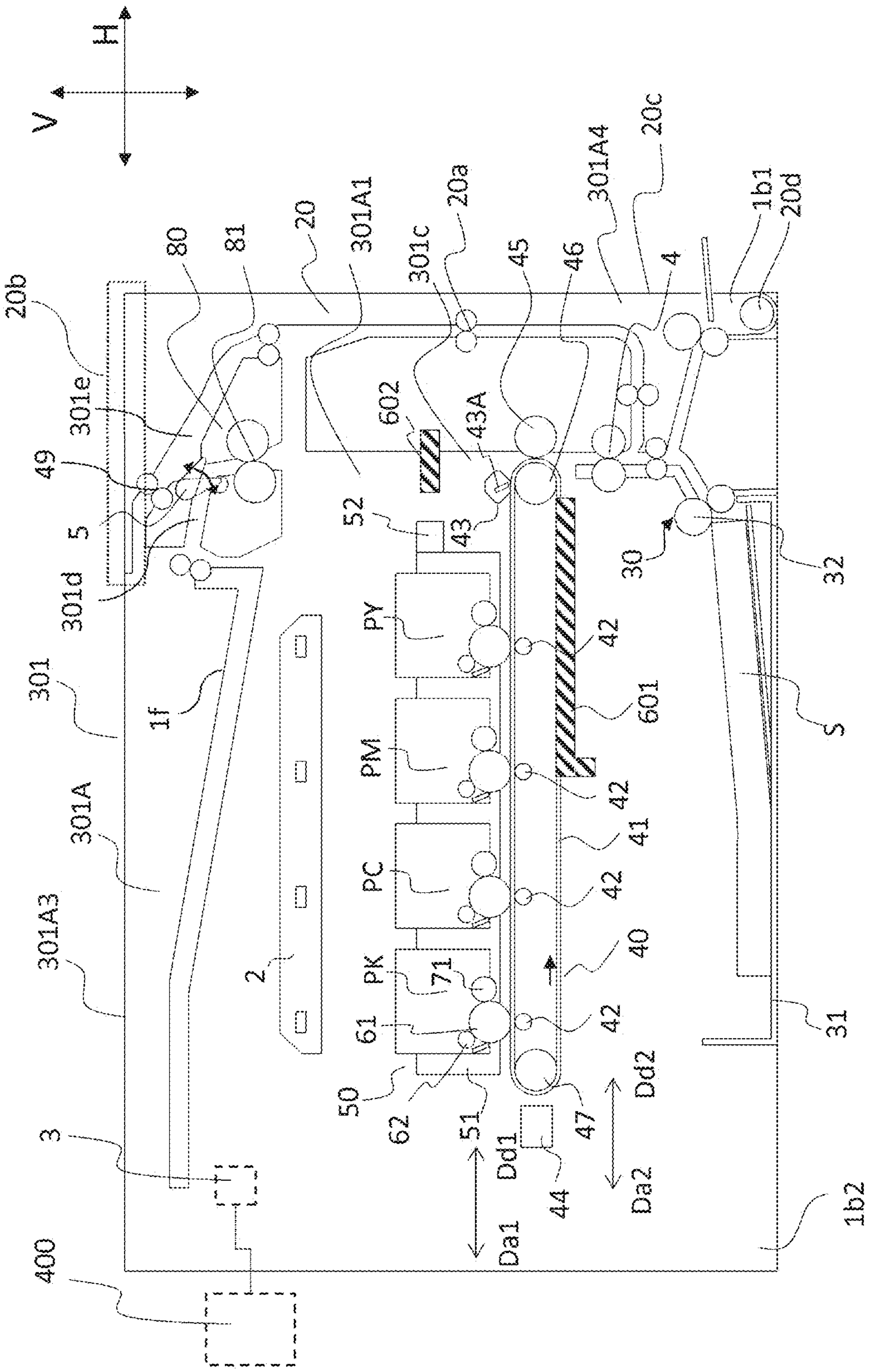
FIG. 1 is a diagram explaining the overall configuration of a printer according to Embodiment 1.

A printer 301, as an image forming apparatus, is described with reference to FIG. 1. FIG. 1 is a diagram explaining the overall configuration of the printer 301 according to this embodiment. In this embodiment, the printer 301 is an electrophotographic color laser beam printer that forms images on a sheet S as a recording material.

The printer 301 includes a main body (housing) 301A, a scanner (exposure apparatus) 2, a controller 3, and a door unit (open/close member) 20 that can be opened and closed relative to the main body 301A. The printer 301 further includes a sheet feeder 30, a transfer unit 40, a tray unit (moving unit or support unit) 50, and a fixing apparatus 80.

The main body 301A and a portion connected thereto including the door unit 20 can be called "main frame." The main frame includes exterior parts of the printer 301.

The main body 301A accommodates the scanner 2, the controller 3, the sheet feeder 30, the transfer unit 40, the tray unit 50, and the fixing apparatus 80.

The sheet feeder 30 includes a carrier tray 31 that carries a stack of sheets S as recording material, and a supply roller 32. The carrier tray 31 can be pulled out toward the door unit 20 to allow sheets S to be replenished.

The tray unit 50 includes a tray (support member or drawer) 51 and cartridges PY, PM, PC, and PK. The tray 51 includes a tray handle 52. The cartridges PY, PM, PC, and PK are removably mounted on the tray 51.

The cartridges PY, PM, PC, and PK are independently removable from the tray 51. The cartridges PY, PM, PC, and PK respectively store yellow (Y), magenta (M), cyan (C), and black (K) toners (developers). The cartridges PY, PM, PC, and PK are configured the same except for the color of the toner they contain. Therefore, where the configuration and operation of any one of the cartridges PY, PM, PC, and PK are described, the description of other cartridges may be omitted. When there is no need to distinguish between cartridges PY, PM, PC, and PK, they may be collectively referred to simply as "cartridges P." The tray unit 50, in other words, includes a plurality of cartridges P and the tray 51 on which the cartridges P are removably mounted.

In this embodiment, the tray unit 50 includes a plurality of photosensitive drums (image bearing members) 61, a plurality of charging rollers 62 (charging members), and a plurality of developing rollers (developer carrying members) 71. More specifically, the tray unit 50 includes four photosensitive drums 61, four charging rollers 62, and four developing rollers 71. The photosensitive drums 61, the developing rollers 71, and the charging rollers 62 have their rotation axes parallel to each other.

The section where black (K) images are formed shall be referred to as "black station (first station)." The photosensitive drum 61, the developing roller 71, and the charging roller 62 in the first station shall be referred to as "first photosensitive drum," "first developing roller," and "first charging roller."

The section where cyan (C) images are formed shall be referred to as "cyan station (second station)." The photosensitive drum 61, the developing roller 71, and the charging roller 62 in the second station shall be referred to as "second photosensitive drum," "second developing roller," and "second charging roller."

The section where magenta (M) images are formed shall be referred to as "magenta station (third station)." The photosensitive drum 61, the developing roller 71, and the charging roller 62 in the third station shall be referred to as "third photosensitive drum," "third developing roller," and "third charging roller."

The section where yellow (Y) images are formed shall be referred to as "yellow station (fourth station)." The photosensitive drum 61, the developing roller 71, and the charging roller 62 in the fourth station shall be referred to as "fourth photosensitive drum," "fourth developing roller," and "fourth charging roller."

The cartridges PK, PC, PM, and PY are respectively mounted in the black, cyan, magenta, and yellow stations. In this embodiment, the cartridges PK, PC, PM, and PY are respectively referred to as first, second, third, and fourth cartridges. Numbers such as first, second, third, and fourth are used only for the sake of explanation.

The photosensitive drums 61, the charging rollers 62, and the developing rollers 71 can be provided to either the cartridges P or the tray 51. In this embodiment, the cartridges P have the photosensitive drums 61, the charging rollers 62, and the charging rollers 71.

The transfer unit 40 is a belt unit that includes a belt 41, primary transfer rollers 42, a cleaner 43, a drive roller 46 for driving the belt 41, and a tension roller (driven roller) 47. The printer 301 in this embodiment is provided with an optical sensor 44 that detects a toner image transferred onto the belt 41. In this embodiment, the belt 41 arranged below the photosensitive drums 61 and supported by the primary transfer rollers 42 is configured to contact with the photosensitive drums 61 so that primary transfer sections are formed between the belt 41 and the photosensitive drums 61.

The printer 301 also has a secondary transfer roller 45 making contact with the belt 41 so that a secondary transfer section is formed. The secondary transfer section is formed between the belt 41 supported by the drive roller 46, and the secondary transfer roller 45. The primary transfer rollers 42, the drive roller 46, the tension roller 47, and the secondary transfer roller 45 have their rotation axes parallel to each other. A pair of registration rollers 4 is disposed before the secondary transfer section in the transport direction of the sheet S.

The fixing apparatus 80 includes a fixing unit 81 and a flapper 5. The fixing apparatus 80 is configured to heat the sheet S. In this embodiment, the fixing unit 81 includes a heating unit (heating roller) including a heater, and a pressing unit (pressing roller). Parts that contribute to transport of the sheet S can be referred to as sheet transport parts. Examples of sheet transport parts include the supply roller 32, the pair of registration rollers 4, the belt 41, the secondary transfer roller 45, and the fixing unit 81. The direction in which the rotation axes of these parts extend can be referred to as a width direction perpendicular to the transport direction of the sheet S.

Figure 2:
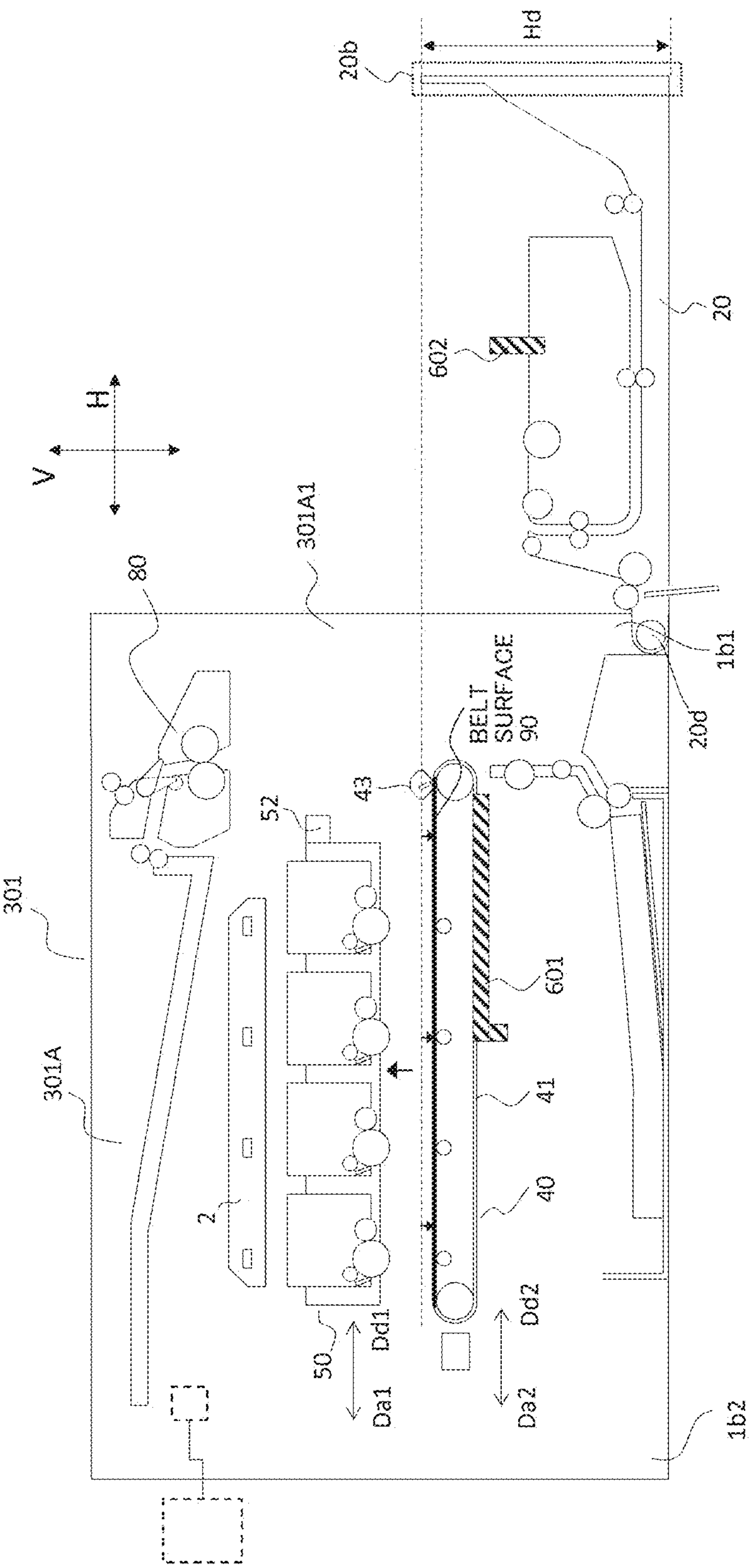
FIG. 2 is a diagram illustrating the printer according to Embodiment 1 with a door unit opened.
Figure 3:
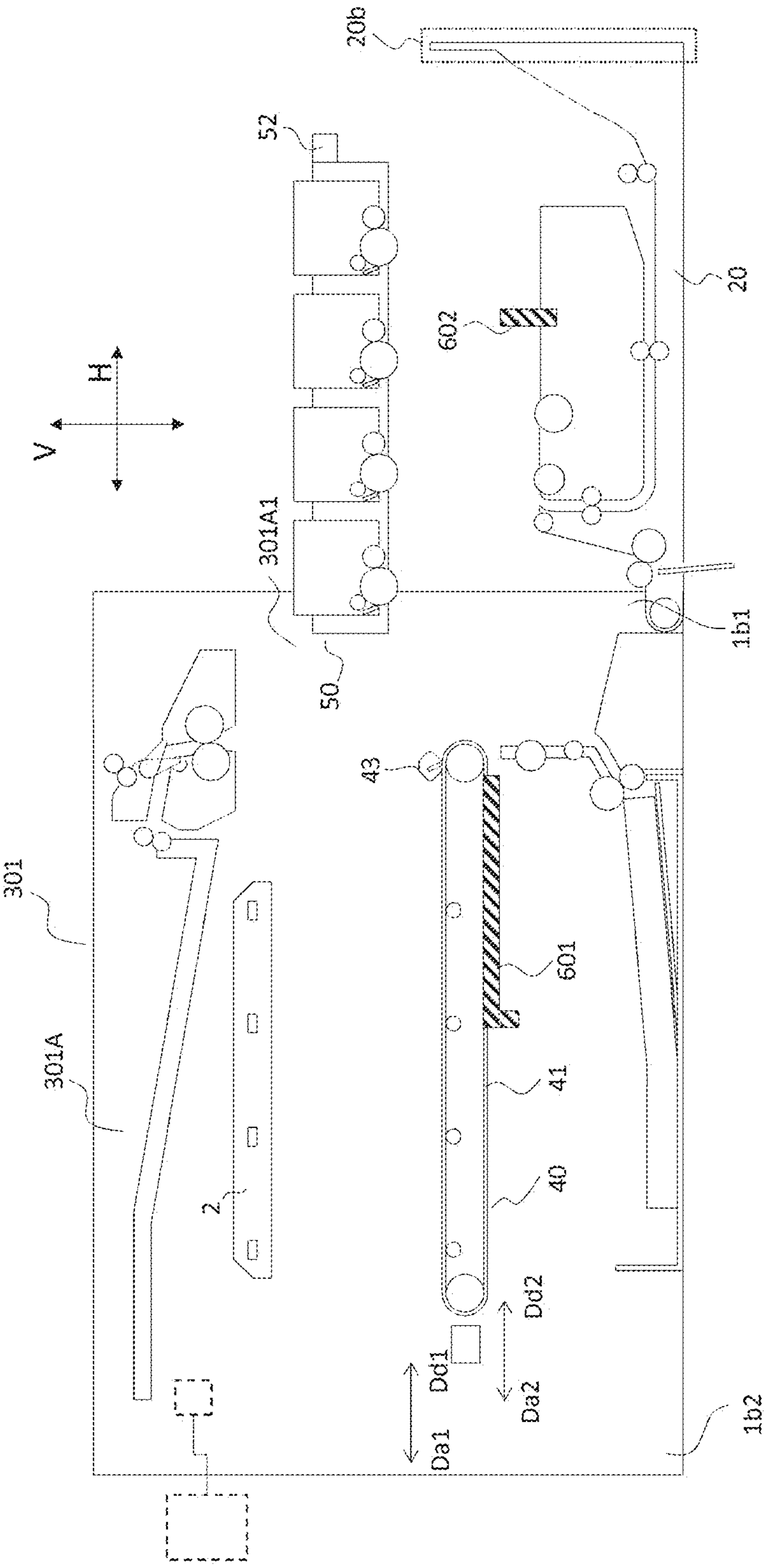
FIG. 3 is a diagram illustrating the printer according to Embodiment 1 with a tray unit pulled out.
Figure 4:
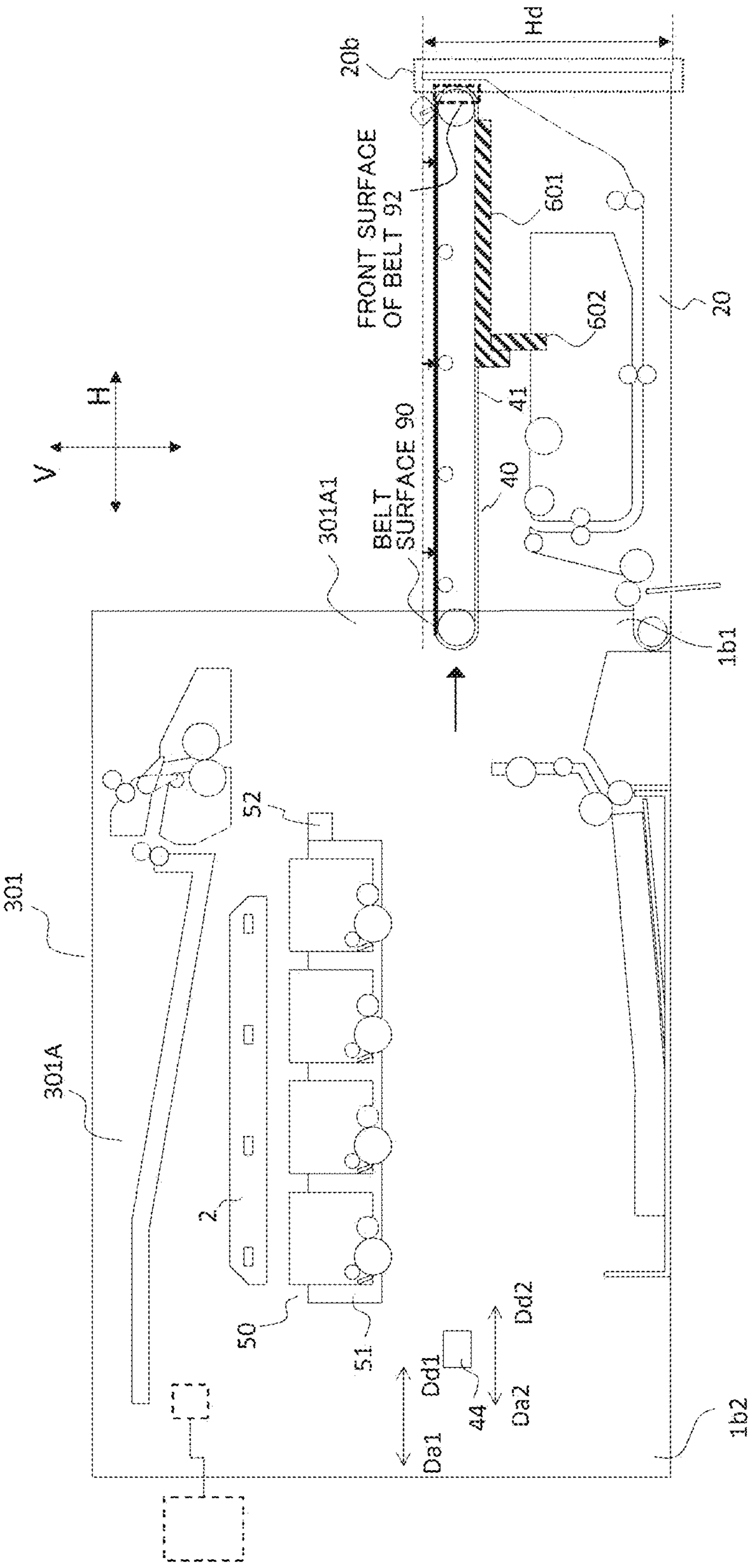
FIG. 4 is a diagram illustrating the printer according to Embodiment 1 with a transfer unit pulled out.

The movement of the transfer unit 40 and the tray unit 50 is described with reference to FIG. 1, FIG. 2, FIG. 3, and FIG. 4. FIG. 2 is a diagram illustrating the printer 301 with the door unit 20 opened. FIG. 3 is a diagram illustrating the printer 301 with the tray unit 50 alone pulled out. FIG. 4 is a diagram illustrating the printer 301 with the transfer unit 40 alone pulled out.

The transfer unit 40 and the tray unit 50 are movable from inside to outside of the main body 301A. The main body 301A has a first end 1*b*1 with an opening 301A1, and a second end 1*b*2 on the opposite side in a horizontal direction H.

The tray unit 50 can be moved to a first inside position inside the main body 301A and a first outside position outside the main body 301A through the opening 301A1. The transfer unit 40 can be moved to a second inside position inside the main body 301A and a second outside position outside the main body 301A through the opening 301A1. The opening 301A1 may include an opening for the tray unit 50 to pass through and an opening for the transfer unit 40 to pass through. The transfer unit 40 moving from the second inside position to the second outside position causes at least the belt 41 to be moved, and at least a part of the belt 41 to protrude outwardly from the main body 301A.

The direction in which the tray unit 50 moves from the first inside position to the first outside position shall be referred to as "tray pull-out direction Dd1 (first pull-out direction)" and the direction opposite to the tray pull-out direction Dd1 as "tray mounting direction Da1 (first mounting direction)." The tray pull-out direction Dd1 can be considered as the direction from the second end 1*b*2 toward the first end 1*b*1.

The direction in which the transfer unit 40 moves from the second inside position to the second outside position shall be referred to as "transfer unit pull-out direction Dd2 (second pull-out direction)" and the direction opposite to the transfer unit pull-out direction Dd2 as "transfer unit mounting direction Da2 (second mounting direction)." The drive roller 46 is disposed downstream of the tension roller 47 in the transfer unit pull-out direction Dd2. The transfer unit pull-out direction Dd2 can be considered as the direction from the second end 1*b*2 toward the first end 1*b*1.

The tray pull-out direction Dd1 and the tray mounting direction Da1 intersect (preferably perpendicularly) the direction of the rotation axes of the photosensitive drums 61. The transfer unit pull-out direction Dd2 and the transfer unit mounting direction Da2 intersect (preferably perpendicularly) the direction of the rotation axis of the drive roller 46. The drive roller 46 and the photosensitive drums 61 have their rotation axes parallel to each other.

The door unit 20 attached to the main body 301A is movable between a closed position and an open position. As shown in FIG. 1, when the door unit 20 is in the closed position (in the closed state), the door unit 20 covers the opening 301A1. As shown in FIG. 2, when the door unit 20 is in the open position (in the open state), the opening 301A1 is revealed. The closed position is where the door unit 20 closes the opening, and the open position is where the door unit 20 opens the opening. The door unit 20 is movable between the closed position and the open position by turning about a rotation axis 20*d* located below the opening 301A1 in a vertical direction.

As shown in FIG. 1, when the door unit 20 is in the closed position, the door unit 20 covers the fixing apparatus 80 attached to the main body 301A. More specifically, when the door unit 20 is in the closed position, an upper cover portion 20*b*, surrounded by the dotted line in the drawing, of the door unit 20, is positioned above the fixing apparatus 80. The upper cover portion 20*b* of the door unit 20 serves as an exterior portion, as well as provides the function of protecting the belt 41 when the door unit 20 is in the open position. This is one of the features of the present disclosure and will be described in more detail later. The door unit 20 includes the upper cover portion 20*b* as an upper cover portion covering at least a portion of an upper surface 301A3 of the main body, and a side cover portion 20*c* covering at least a portion of a side face 301A4 of the main body.

The door unit 20 is movable to the open position and to the closed position with the fixing apparatus 80 supported on the main body 301A. In other words, the door unit 20 is movable from the closed position to the open position such as to move away from the fixing apparatus 80 supported on the main body 301A. Therefore, as shown in FIG. 2, when the door unit 20 is in the open position, the door unit 20 is located away from the fixing apparatus 80 supported on the main body 301A. The transfer unit 40 and the tray unit 50 can move through the opening 301A1 from inside to outside of the main body 301A. FIG. 3 and FIG. 4 show these units after they have moved out.

With the tray unit 50 moved out of the main body 301A (FIG. 3), the cartridges PY, PM, PC, and PK allow themselves to be removed from the tray 51 and to be attached to the tray 51. Thus, the cartridges PY, PM, PC, and PK can be replaced with new cartridges PY, PM, PC, and PK. In this embodiment, the cartridges P can be removed from and attached to the tray 51 in directions intersecting (preferably perpendicularly) the direction of the rotation axes of the photosensitive drums 61.

When removed from the tray 51, the cartridges PY, PM, PC, and PK are moved away from the tray 51 in the opposite direction to the transfer unit 40. In this embodiment, the transfer unit 40 is disposed below the tray unit 50. Therefore, when removed from the tray 51, the cartridges PY, PM, PC, and PK are moved up from the tray 51.

Moreover, the transfer unit 40 is removable from the main body 301A independently of the tray unit 50, to be replaced with a new transfer unit 40.

Image Forming Operation

The image forming operation of the printer 301 is described with reference to FIG. 1. The controller 3 of the printer 301 starts an image forming operation on a sheet S based on an image signal received from an external host device 400. The external host device 400 is, for example, a personal computer, an image reader, or a facsimile.

During the image formation on the sheet S, the tray unit 50 is in the first inside position, the transfer unit 40 is in the second inside position, and the door unit 20 is in the closed position. When the transfer unit 40 is in the second inside position, the belt 41 can contact the photosensitive drums 61. In this state, the tray unit 50 is located above the transfer unit 40.

A charging voltage is applied to the charging rollers 62, and the photosensitive drums 61 are started to rotate. The photosensitive drums 61 are irradiated with laser from the scanner 2 according to image information, which exposes a surface of the photosensitive drums 61 charged by the charging rollers 62. Thus, an electrostatic latent image according to the image information is formed on the surface of the photosensitive drums 61.

The developing rollers 71 carry toner. A developing voltage is applied to the developing rollers 71, so that the electrostatic latent image formed on the photosensitive drums 61 is developed with the toner supplied from the developing rollers 71. Thus, a toner image is formed on the photosensitive drums 61. In this embodiment, the electrostatic latent image is developed with the developing rollers 71 making contact with the photosensitive drums 61. Instead, an electrostatic latent image can be developed using the developing rollers 71 with a gap between the developing rollers 71 and the photosensitive drums 61. When a full-color image is formed, toner images are formed on the respective photosensitive drums 61.

In this embodiment, with the tray unit 50 being in the first inside position, the developing rollers 71 are movable between a contacting position where they contact the photosensitive drums 61 and a separated position away from the photosensitive drums 61. More specifically, the main body 301A is provided with a switching mechanism (not shown) to switch the position of the developing rollers 71 between the contacting position and the separated position. This allows the developing rollers 71 to be kept separated from the photosensitive drums 61 when no image forming operation is being carried out.

The printer 301 also allows monochrome printing by the developing roller 71 and the photosensitive drum 61 in the cartridge PK making contact with each other while the respective developing rollers 71 and the photosensitive drums 61 of the cartridges PY, PM, and PC are separated from each other. The printer 301 allows full-color printing by the respective photosensitive drums 61 of the cartridges PY, PM, PC, and PK making contact with the belt 41.

The toner images formed on the respective photosensitive drums 61 are transferred onto the belt 41 by the primary transfer rollers 42 in the first transfer sections, and transported to the secondary transfer section that is formed by the belt 41 and the secondary transfer roller 45.

Inside the main body 301A is formed a transport passage 301*c* for the sheets S to pass through toward the fixing apparatus 80. The door unit 20 is provided with a transfer unit support 602 indicated by hatching. As shown in FIG. 1, the transport passage 301*c* and the transfer unit support 602 overlap each other as viewed in the width direction (depth direction in FIG. 1). However, the transport passage through which the sheets S pass and the transfer unit support 602 do not overlap in their widthwise positions, so that the transfer unit support 602 does not obstruct the transport of the sheets S. In the door unit 20 is formed a duplex-printing transport passage 20*a* for the sheets S coming out of the fixing apparatus 80 to pass through. The door unit 20 in the closed position covers the transport passage 301*c*. When the door unit 20 is opened, the transport passage 301*c* and the duplex-printing transport passage 20*a* are exposed. When the door unit 20 is opened, the transfer unit support 602 is also exposed, as shown in FIG. 2.

In the sheet feeder 30, the supply roller 32 separates and sends out one sheet S from the stack of sheets S on the carrier tray 31 at a predetermined timing. The sheet travels through the pair of registration rollers 4 toward the secondary transfer section and the fixing apparatus 80.

In the secondary transfer section, the toner image is transferred from the belt 41 onto the sheet S. Any toner that was not transferred onto the sheet S is removed from the belt 41 by a cleaning blade (cleaning member) 43A provided inside the cleaner 43.

The sheet S carrying the toner image that was transferred in the secondary transfer section is transported to the fixing apparatus 80. In the fixing apparatus 80, heat and pressure are applied to the sheet S by the fixing unit 81, so that the toner image is fixed on the sheet S. The sheet S carrying the fixed toner image is transported toward the flapper 5, which serves as a passage switching section.

The flapper 5 is movable between a paper discharge position where it guides the sheet S coming from the fixing apparatus 80 toward a paper discharge passage 301*d*, and a reversing position where it guides the sheet to a reversal passage 301*e*.

During simplex printing where an image is formed on one side of the sheet S, the flapper 5 guides the sheet S to the paper discharge passage 301*d*, so that the sheet is discharged onto a discharge tray 1*f* formed at the top of the main body 301A.

On the other hand, during duplex printing where an image is formed on one side and the backside of the sheet S, the flapper 5 guides the sheet S to the reversal passage 301*e*. The sheet S guided to the reversal passage 301*e* is turned upside down by a pair of reversal rollers 49 to travel in the reverse direction, and transported toward the secondary transfer section through the duplex-printing transport passage 20*a* formed in the door unit 20. After a toner image is transferred onto the backside of the sheet S in the secondary transfer section, the sheet S is passed through the fixing apparatus 80, guided to the paper discharge passage 301*d* by the flapper 5, and discharged onto the discharge tray 1*f* of the main body 301A.

Mobility Configuration for Tray Unit and Transfer Unit and its Effects

The configuration that allows the tray unit 50 and the transfer unit 40 to be pulled out and its effects are described with reference to FIG. 1, FIG. 2, FIG. 3, and FIG. 4.

As shown in FIG. 1, when the tray unit 50 is in its first inside position and the transfer unit 40 is in its second inside position, a part of the transfer unit 40 (cleaner 43 in this embodiment) is located downstream of the tray unit 50 in the horizontal direction H, in the moving direction in which the tray unit 50 moves from the first inside position toward the first outside position (Dd1). The area where this part of the transfer unit 40 (cleaner 43 in this embodiment) is located downstream of the tray unit 50 overlaps at least partly with the area where the tray unit 50 is located, in the vertical direction V. Therefore, to be pulled out of the main body 301A, the tray unit 50 needs to circumvent the cleaner 43.

The tray unit 50 moves out of the main body 301A along the track described below. As shown in FIG. 2, the tray unit 50 is lifted away from the transfer unit 40 simultaneously with the opening movement of the door unit 20. The position of the tray unit 50 at this time shall be referred to as "first intermediate position." When the door unit 20 is closed in this state, the tray unit 50 moves down to the first inside position. When the tray unit 50 is in the first intermediate position, the belt 41 is separated from the photosensitive drums 61.

After that, the user grips the tray handle 52 and moves the tray unit 50 toward the outside of the main body 301A. As shown in FIG. 3, the tray unit 50 moves out of the main body 301A, passing through the opening 301A1 between the transfer unit 40 and the fixing apparatus 80.

Next, the configuration that allows the transfer unit 40 to be pulled out, which is a feature of the present disclosure, is described. The printer 301 in this embodiment allows the transfer unit 40 to move out of the main body 301A (second outside position) as shown in FIG. 4. The transfer unit 40 is removable from the main body 301A and can be replaced with a new transfer unit 40. To protect the damage-susceptible belt 41 in the transfer unit 40 during replacement, and to enable the user to intuitively recognize the stop position for the pulled-out transfer unit 40, the upper cover portion 20*b* of the door unit 20 has an upper end 20*b*_upper that is positioned higher than the surface of the belt 41 that makes contact with the photosensitive drums 61. The height of the door unit 20 in the vertical direction V when the door unit 20 is in its open position shall be referred to as "height Hd." The height Hd in this embodiment is the same as the height of the upper cover portion 20*b* of the door unit 20 in the closed position.

This feature will be described in more detail with reference to FIG. 2, FIG. 4, and FIG. 5. First, in FIG. 2, the transfer unit 40 is in the second inside position. With the transfer unit in the second inside position, the surface of the belt 41 that makes contact with the photosensitive drums 61 (denoted as "belt surface 90" in the drawing) is positioned lower than the height Hd of the upper cover portion 20*b* of the door unit 20. A transfer unit abutment member 601, indicated by hatching, is located at one end in the depth direction of the transfer unit 40, so as not to interfere with other components when the transfer unit is pulled out of the second inside position, allowing the transfer unit to move to the second outside position. The transfer unit abutment member 601 makes contact only with the transfer unit support 602. The transfer unit 40 can move horizontally when shifting from the second inside position to the second outside position, so that the belt 41 is always positioned lower than the height Hd of the upper cover portion 20*b* of the door unit 20.

Next, in FIG. 4, the transfer unit 40 is in the second outside position. When the transfer unit 40 is in the second outside position, the surface 90 of the belt 41 that makes contact with the photosensitive drums 61 is positioned lower than the height Hd of the upper cover portion 20*b* of the door unit 20. The belt surface 90 covers and protects a front surface of the belt 41. The definition of the "front surface" will be given later with reference to FIG. 5. When the transfer unit 40 is pulled out, the transfer unit abutment member 601 and the transfer unit support 602, both indicated by hatching, contact with each other and serve as a stopper. The upper cover portion 20*b* of the door unit 20 having the height Hd greater than the height of the surface of the belt 41 that makes contact with the photosensitive drums 61 allows the user to intuitively recognize that the transfer unit 40 will stop before the upper cover portion 20*b*.

Figure 5:
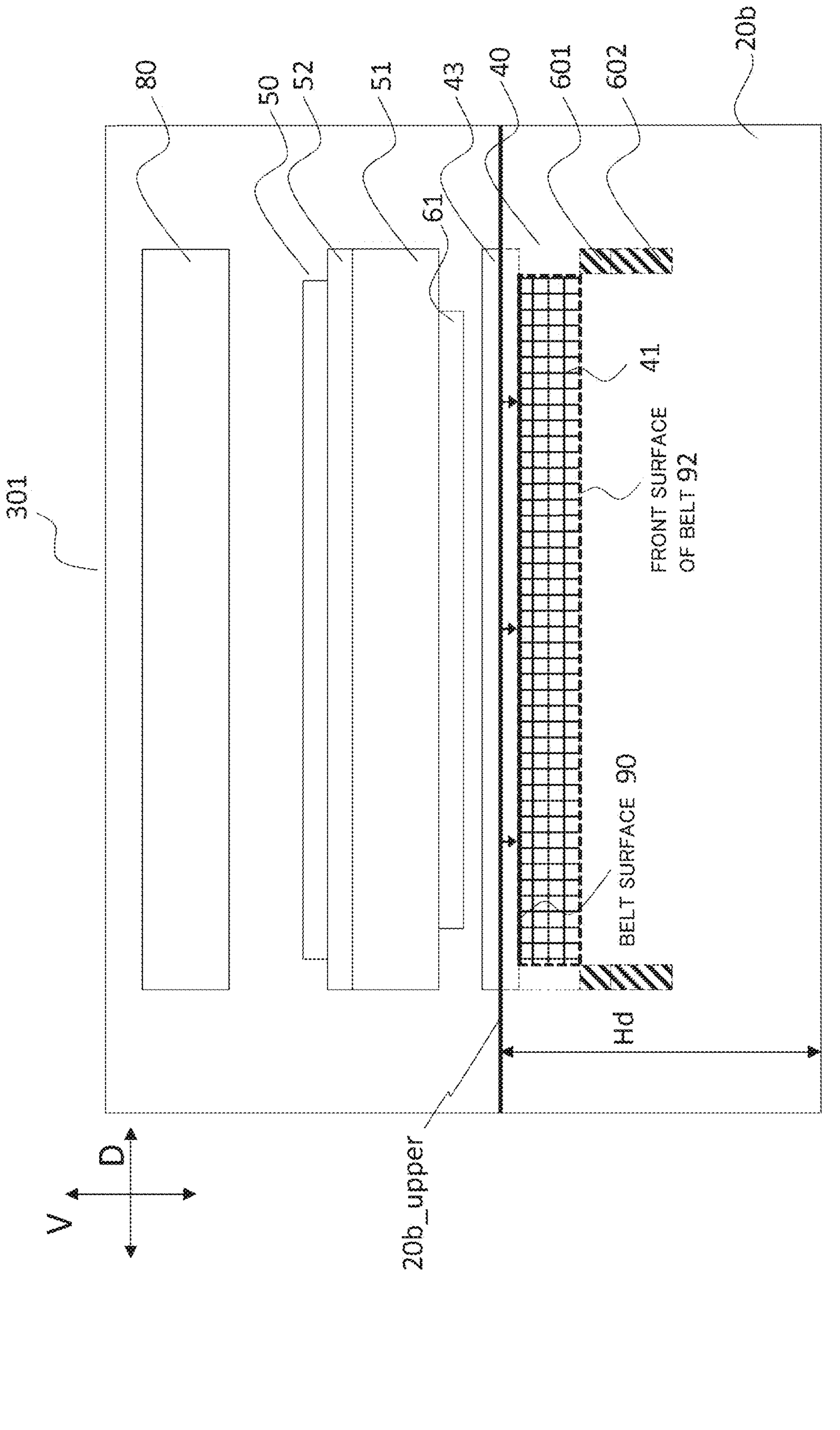
FIG. 5 is a diagram illustrating the printer according to Embodiment 1 with the transfer unit pulled out, viewed from a different direction.

Lastly, referring to FIG. 5, how a front surface of the belt 41 is protected is described. FIG. 5 is a diagram illustrating the printer 301 with the door unit 20 open and only the transfer unit 40 pulled out, similarly to FIG. 4. Unlike FIG. 4, the diagram shows the printer as viewed from the opened door unit 20 side. FIG. 5 is a view showing the printer 301 in the horizontal direction H from the first end 1*b*1 toward the second end 1*b*2. In FIG. 5, arrow D indicates the width direction D. As has been described before with reference to FIG. 4, when the transfer unit 40 is pulled out, the surface 90 of the belt 41 making contact with the photosensitive drums 61 in the transfer unit 40 is positioned lower than the upper end 20*b*_upper (height Hd) of the upper cover portion 20*b* of the door unit 20. In this configuration, when the user pulls out the transfer unit 40, the upper cover portion 20*b* is positioned in front of the front surface 92 (depicted with grids) of the belt 41. This reduces the risk of the user touching the front surface of the belt 41, and prevents the user from accidentally damaging the front surface of the belt 41. The "front surface" here refers to a most upstream portion of the belt 41 in the direction of movement of the transfer unit 40 from the inside to the outside of the main body 301A.

As shown in FIG. 5, the upper end 20*b*_upper of the upper cover portion 20*b* has a greater length than the belt surface 90 in the width direction D. One end and the other end in the width direction D of the upper end 20*b*_upper are positioned more outside than the belt surface 90. In other words, the belt surface 90 is positioned between one end and the other end in the width direction D of the upper end 20*b*_upper. Therefore, the belt surface 90 can be protected even more reliably. In addition, the cleaner 43 has an upper end that is positioned higher than the upper end 20*b*_upper of the upper cover portion 20*b*. Thus, the cleaner 43 helps to protect the belt surface 90 even more reliably.

While an image forming apparatus that performs color printing has been described in detail in this embodiment, this is not intended to limit the disclosure to this apparatus. The image forming apparatus can be configured to perform monochrome printing.

Embodiment 2

Embodiment 2 is described. In Embodiment 2, elements similar to those of the embodiment described above are given the same reference numerals. Description of the elements similar to those of the previously described embodiment may be omitted.

This embodiment differs from Embodiment 1 in that the transfer unit 740 is pulled out at the same time when the tray unit 750 is pulled out.

Relationship Between Tray Unit and Transfer Unit

Figure 6:
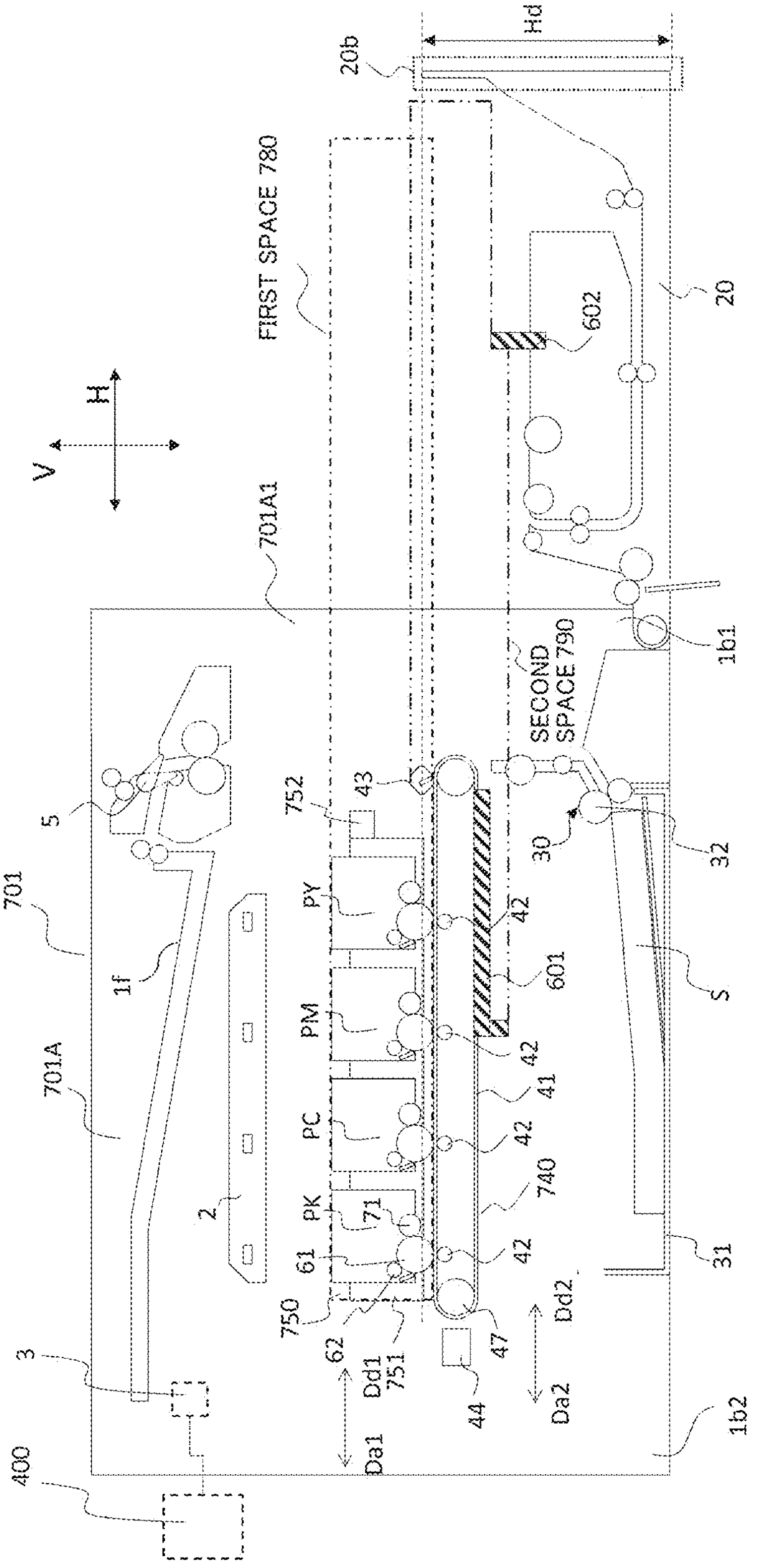
FIG. 6 is a diagram illustrating a printer according to Embodiment 2 with a door unit opened.
Figure 7:
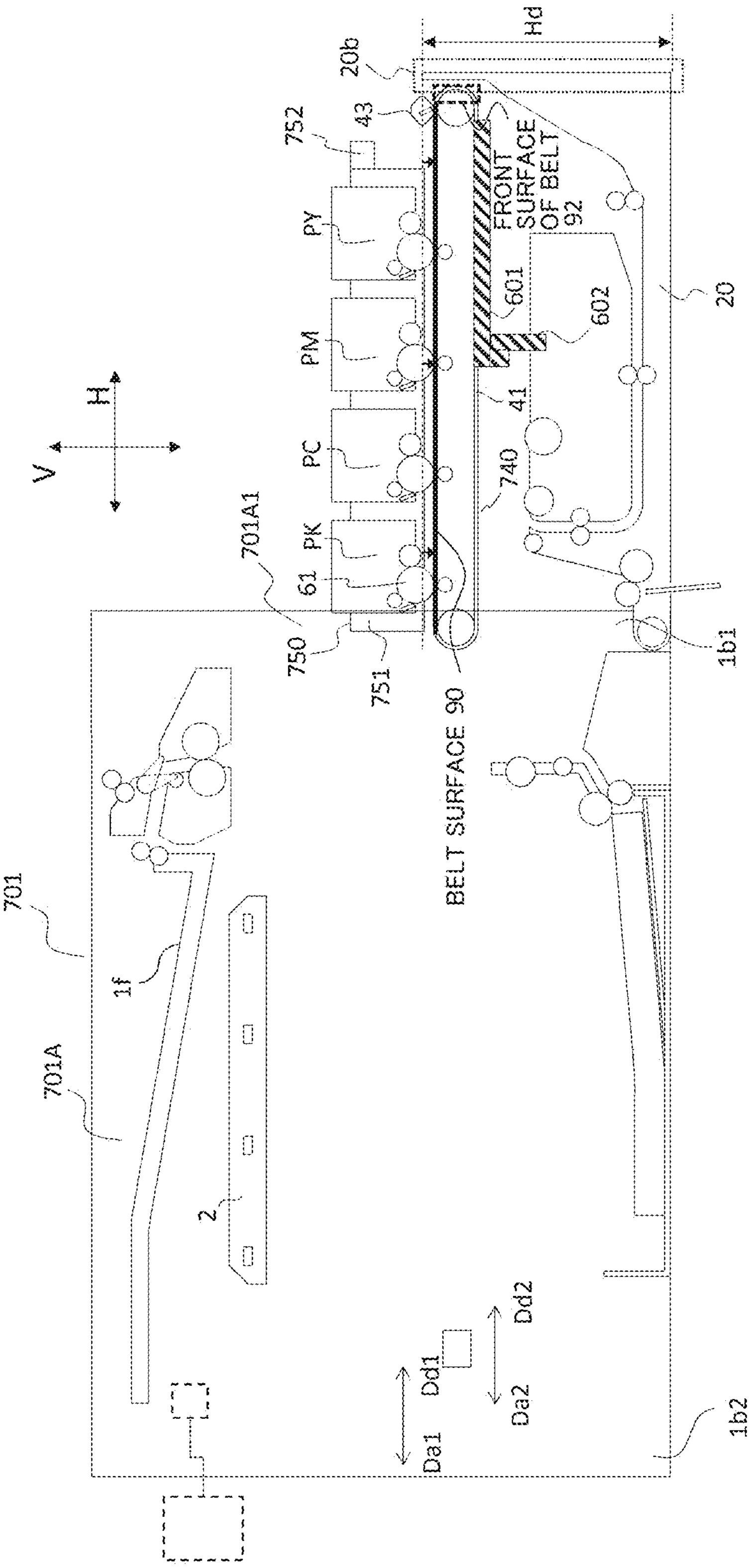
FIG. 7 is a diagram illustrating the printer according to Embodiment 2 with a transfer unit and a tray unit pulled out.

The relationship between the tray unit 750 and the transfer unit 740, and the movements of the tray unit 750 and the transfer unit 740 are described with reference to FIG. 6 and FIG. 7. FIG. 6 is an overall view of a printer 701 in this embodiment with the door unit 20 opened. FIG. 7 is an overall view of the printer 701 in this embodiment with the tray unit 750 and the transfer unit 740 pulled out at the same time.

The tray unit 750 passes through a predetermined space when it moves between a first inside position where an image forming operation is performed to a sheet S, and a first outside position where the tray unit allows cartridges P to be replaced. This space through which the tray unit 750 passes when it moves from the first inside position to the first outside position shall be referred to as "first space 780." The first space 780 is a movement area for the tray unit 750.

The transfer unit 740 passes through a predetermined space when it moves between a second inside position where an image forming operation is performed to a sheet S, and a second outside position. This space through which the transfer unit 740 passes when it moves from the second inside position to the second outside position shall be referred to as "second space 790." The second space 790 is a movement area for the transfer unit 740.

In this embodiment, at least a part of the transfer unit 740 overlaps the first space through which the tray unit 750 passes when the tray unit 750 moves from the first inside position to the first outside position. Instead, the transfer unit may partly overlap a space where the cartridges P pass through. This arrangement will allow the main body 701A to be reduced in size as compared to the configuration where the transfer unit 740 in the second inside position is located outside of the first space.

A "part of the transfer unit 740 that overlaps the first space" in the printer 701 of this embodiment is the cleaner 43 that accommodates the cleaning member 43A. Instead, other parts of the transfer unit 740 may overlap the first space. In this embodiment, the cleaning member 43A of the transfer unit 740 in the second inside position overlaps the first space.

In other words, the tray unit 750 and the transfer unit 740 satisfy the following relationships. When the tray unit 750 is in its first inside position and the transfer unit 740 is in its second inside position, a part of the transfer unit 740 (cleaner 43) is located downstream of the tray unit 750 in the horizontal direction H, in the moving direction in which the tray unit 750 moves from the first inside position toward the first outside position. In addition, the region (area) where the part of the transfer unit 740 (cleaner 43) is located downstream of the tray unit 750 overlaps at least partly with the region (area) where the tray unit 750 is located, in the vertical direction V.

As described above, when the transfer unit 740 is in the second inside position, at least a part of the transfer unit 740 is inside the first space. Therefore, in this embodiment, when the user moves the tray unit 750 from the first inside position to the first outside position relative to the main body 701A, the transfer unit 740 is also moved from the second inside position to the second outside position relative to the main body 701A. Namely, the tray unit 750 moves from the first inside position to the first outside position, and the transfer unit 740 moves from the second inside position to the second outside position, integrally as one piece.

As shown in FIG. 7, when the door unit 20 is opened, with the tray unit 750 in its first outside position and the transfer unit 740 in its second outside position, the transfer unit 740 supports the tray unit 750 from below. In addition, in this embodiment, the door unit 20 supports the transfer unit 740. Namely, the transfer unit 740 supported by the door unit 20 supports the tray unit 750. This state can be interpreted as the door unit 20 supporting the tray unit 750 via the transfer unit 740.

Configuration for Integrally Moving Tray Unit and Transfer Unit

Figure 8:
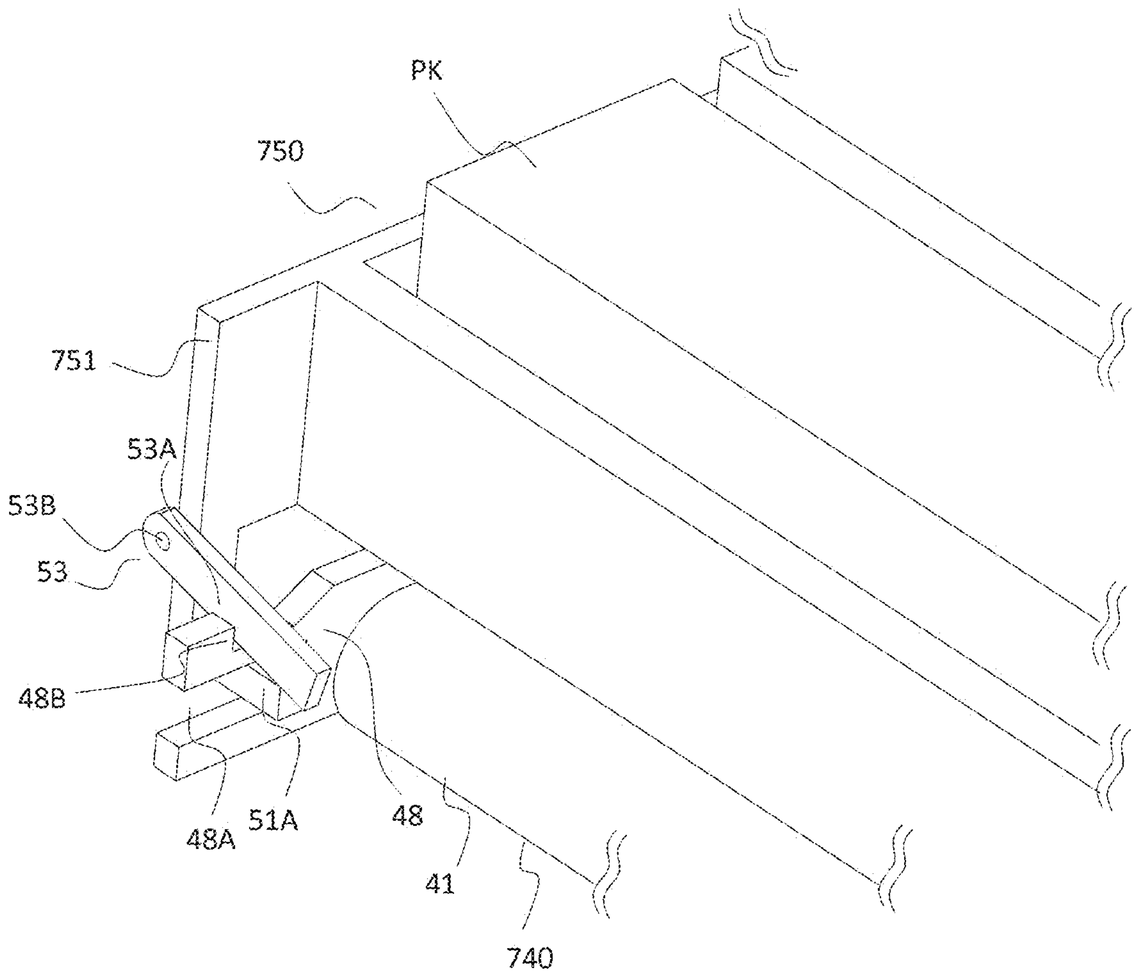
FIG. 8 is a diagram illustrating a coupling member coupling the tray and the transfer unit according to Embodiment 2.
Figure 9:
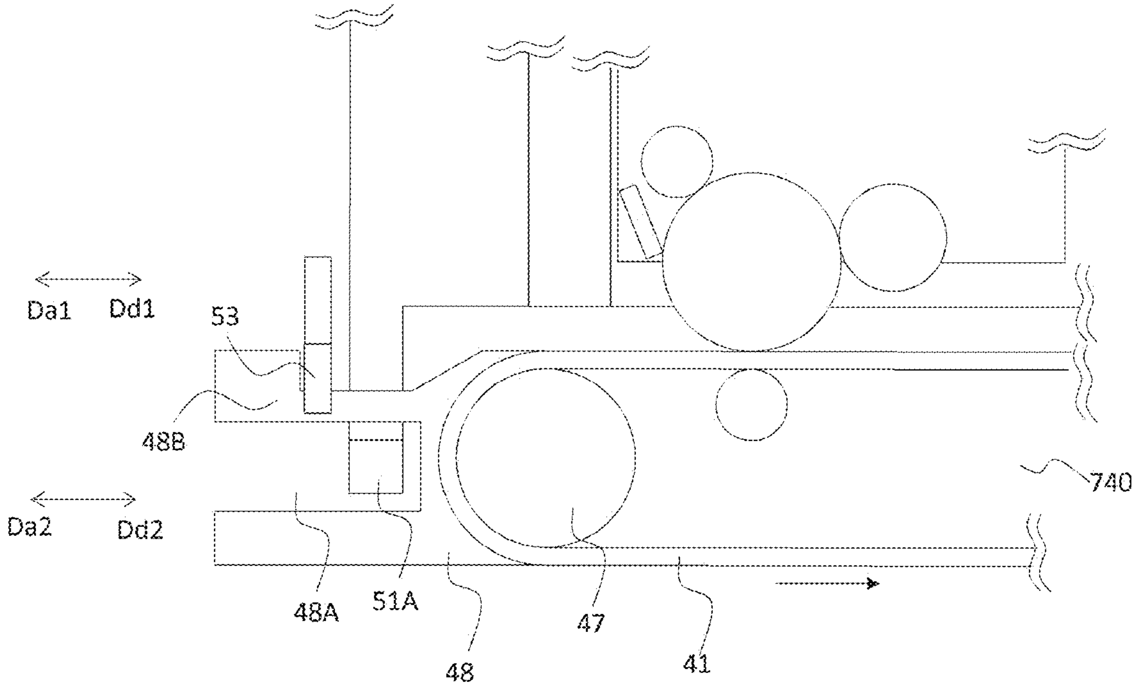
FIG. 9 is a diagram illustrating the coupling member coupling the tray and the transfer unit according to Embodiment 2.
Figure 10:
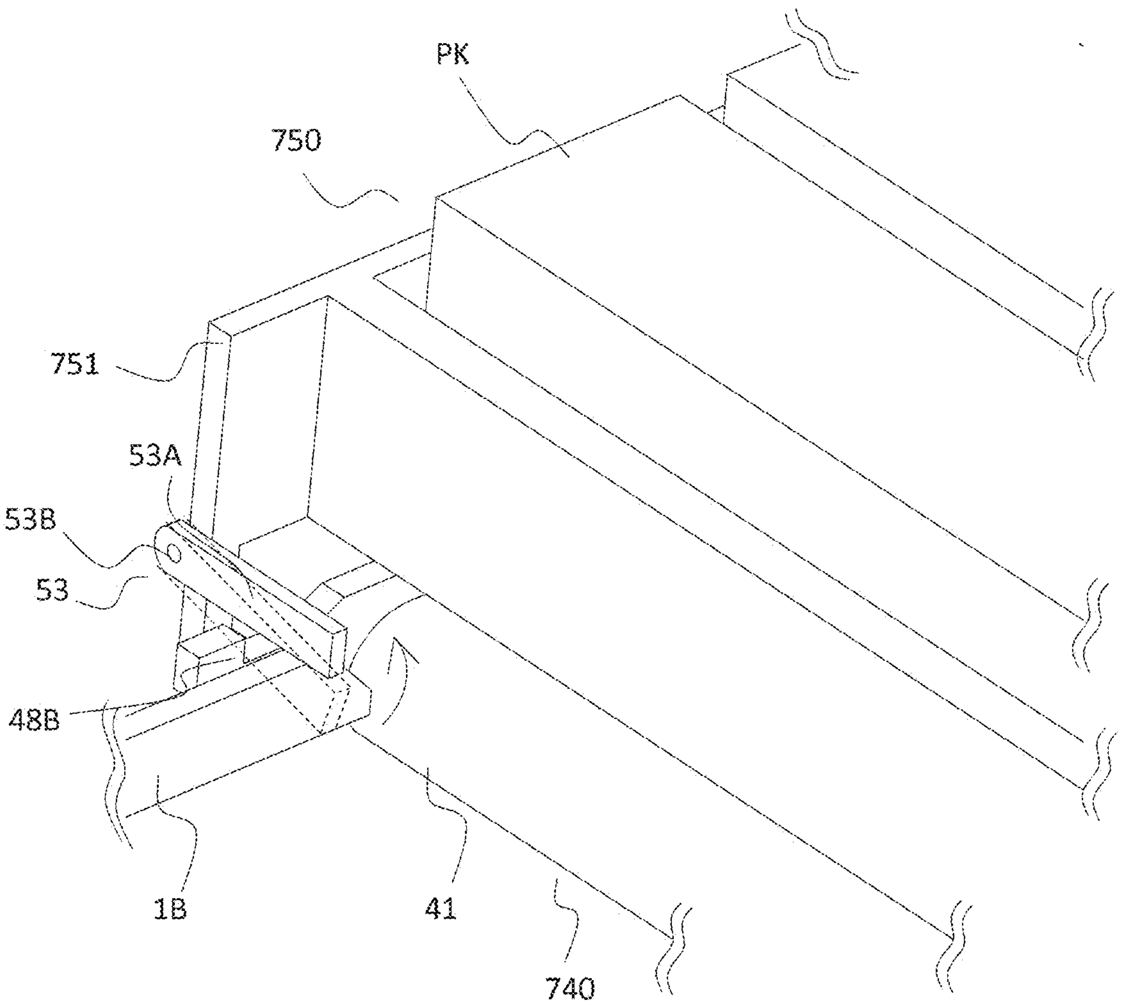
FIG. 10 is a diagram illustrating the coupling member coupling the tray and the transfer unit according to Embodiment 2.

The configuration for integrally moving the tray unit 750 and the transfer unit 740 is described with reference to FIG. 8, FIG. 9, and FIG. 10. FIG. 8, FIG. 9, and FIG. 10 are diagrams for explaining a coupling member (including a lever, a stopper, and a lock member) 53 that couples the tray 751 of the tray unit 750 and the transfer unit 740.

The printer 701 according to this embodiment includes a lock member 53. In this embodiment, the lock member 53 is provided to the tray 751 of the tray unit 750. The lock member 53 includes a transfer unit locking portion 53A, and is rotatable about a rotation center 53B.

The tray 751 includes a transfer unit coupling portion 51A. The transfer unit 740 includes the drive roller 46, the tension roller 47, and a transfer roller frame 48 that supports the primary transfer rollers 42. The transfer roller frame 48 includes a tray coupling groove 48A and a lock member coupling portion 48B.

The lock member 53 rotates about the rotation center 53B, to move between a coupling position where the transfer unit locking portion 53A engages the lock member coupling portion 48B, so that the transfer unit 740 and the tray unit 750 are connected together, and a release position where the lock member 53 is retracted from the coupling position.

With the transfer unit coupling portion 51A engaging with the tray coupling groove 48A, the tray unit 750 is restricted from moving in the first pull-out direction Dd1 and directions perpendicular to the first pull-out direction Dd1 relative to the transfer unit 740. On the other hand, the transfer unit 740 is restricted from moving in the second mounting direction Da2 and directions perpendicular to the second mounting direction Da2 relative to the tray unit 750.

A similar configuration is provided to the tension roller 47 and the drive roller 46 at a total of four locations, near both ends in the direction of the rotation axis of the tension roller 47 and the drive roller 46.

When the transfer unit locking portion 53A of the lock member 53 in the coupling position engages with the lock member coupling portion 48B, the tray unit 750 is restricted from moving in the first mounting direction Da1 relative to the transfer unit 740. On the other hand, the transfer unit 740 is restricted from moving in the second pull-out direction Dd2 relative to the tray unit 750.

The lock member 53 and the lock member coupling portion 48B can also be provided at both ends, in the direction of the rotation axis of the tension roller 47, of the transfer unit 740.

Namely, with the transfer unit coupling portion 51A engaging with the tray coupling groove 48A, and with the lock member 53 in the coupling position engaging with the lock member coupling portion 48B, the transfer unit 740 and the tray unit 750 are restricted from moving relative to each other. In this state, there can be some play between the transfer unit 740 and the tray unit 750.

In other words, the transfer unit coupling portion 51A and the lock member 53 serve as a tray-side coupling mechanism, while the tray coupling groove 48A and the lock member coupling portion 48B serve as a transfer unit-side coupling mechanism. The tray-side coupling mechanism and the transfer unit-side coupling mechanism coupling together join the tray unit 750 and the transfer unit 740, allowing them to move integrally.

The main body 701A includes a lock release portion 1*b* as shown in FIG. 10. When the tray unit 750 is in its first inside position and the transfer unit 740 is in its second inside position, the lock member 53 is in contact with the lock release portion 1*b* and located at the release position. In this state, the transfer unit locking portion 53A is separated from the lock member coupling portion 48B.

With the lock member 53 being in the release position, the tray unit 750, when moved in the first pull-out direction Dd1, causes the transfer unit coupling portion 51A to push the transfer unit 740 in the second pull-out direction Dd2. This results in the transfer unit 740 moving integrally with the tray unit 750 in the second pull-out direction Dd2. Moving the tray unit 750 a predetermined distance in the first pull-out direction Dd1 causes the lock member 53 to separate from the lock release portion 1*b* and to move to the coupling position to engage with the lock member coupling portion 48B. The tray unit 750 and the transfer unit 740 are moved to the first and second outside positions, respectively, with the lock member 53 in its coupling position engaging with the lock member coupling portion 48B.

With the lock member 53 engaging with the lock member coupling portion 48B, moving the tray unit 750 in the first mounting direction Da1 causes the lock member 53 to push the transfer unit 740 in the second mounting direction Da2. This results in the transfer unit 740 moving integrally with the tray unit 750 in the second mounting direction Da2.

With the lock member 53 engaging with the lock member coupling portion 48B, moving the transfer unit 740 in the second mounting direction Da2 causes the transfer unit 740 to push the transfer unit coupling portion 51A, so that the tray unit 750 is pushed in the first mounting direction Da1. This results in the tray unit 750 moving integrally with the transfer unit 740 in the first mounting direction Da1.

When the tray unit 750 and the transfer unit 740 are integrally moved into the main body 701A, the lock release portion 1*b* shifts the lock member 53 to the release position. In this state, the transfer unit 740 does not move when the tray unit 750 is moved in the first mounting direction Da1. Therefore, in the process of closing the door unit 20, the secondary transfer roller 45 contacting the transfer unit 740 applies a force to push the transfer unit 740 in the second mounting direction Da2, thereby pushing the transfer unit 740 deeper (second inside position) into the main body 701A. Namely, the door unit 20 is able to push the transfer unit 740 so as to move the transfer unit 740 to the second inside position. It can also be said that the door unit 20 is able to push the tray unit 750 so as to move the tray unit 750 to the first inside position.

On the other hand, when the lock member 53 is in its release position, with the tray unit 750 being in its first inside position, the transfer unit 740 allows itself to be moved in the second pull-out direction Dd2, independently of the tray unit 750, from the second inside position toward the second outside position. The printer 701 in this embodiment, similarly to Embodiment 1, allows the transfer unit 740 to move out of the main body 701A (second outside position), with the tray unit 750 being positioned inside the main body 701A (first inside position). The transfer unit 740 is removable from the main body 701A and can be replaced with a new transfer unit 740.

In this embodiment, when the tray unit 750 is in the first inside position, the tray unit 750 is positioned relative to the main body 701A independently of the transfer unit 740. When the transfer unit 740 is in the second inside position, the transfer unit 740 is positioned relative to the main body 701A independently of the tray unit 750. This is because of priority given to more precise positioning of each of the transfer unit 740 and the tray unit 750 relative to the main body 701A. For this reason, when the tray unit 750 is in the first inside position and the transfer unit 740 is in the second inside position, there is a slight clearance between the tray coupling groove 48A and the transfer unit coupling portion 51A.

Alternatively, there can be no clearance between the tray coupling groove 48A and the transfer unit coupling portion 51A so that the tray unit 750 and the transfer unit 740 can position each other when the tray unit 750 is in the first inside position and the transfer unit 740 is in the second inside position. This will allow more precise positioning of the transfer unit 740 and the tray unit 750 relative to each other.

Effects of Integrally Moving Tray Unit and Transfer Unit

The effects of pulling out the tray unit 750 and the transfer unit 740 are described with reference to FIG. 6 and FIG. 7.

The configuration that allows the transfer unit 740 to be pulled out at the same time when the tray unit 750 is pulled out, which is a feature of this embodiment, will be described.

As shown in FIG. 6, the tray unit 750 is not lifted up when the door unit 20 is opened, because there is no need to move the tray unit 750 to the first intermediate position unlike Embodiment 1.

The mechanism described above for uniting the tray unit 750 and the transfer unit 740 allows the user to move the tray unit 750 and the transfer unit 740 in the main body 701A outwardly by gripping the tray handle 752.

The tray unit 750 and the transfer unit 740 move out of the main body 701A, passing through the opening 701A1, as shown in FIG. 7.

By moving the tray unit 750 and the transfer unit 740 integrally, the photosensitive drums 61 are prevented from being exposed as the tray unit 750 moves to the first outside position, so that possibility of damaging or contaminating the photosensitive drums 61 can be minimized. Moreover, the susceptible surface of the belt 41 that makes contact with the photosensitive drums 61 can be protected when replacing cartridges.

In addition, as with Embodiment 1, there are further advantages of the upper cover portion 20*b* of the door unit 20 having height Hd positioned higher than the surface 90 of the belt 41 that makes contact with the photosensitive drums 61.

This feature will be described in more detail with reference to FIG. 6 and FIG. 7. First, in FIG. 6, the tray unit 750 is in the first inside position, and the transfer unit 740 is in the second inside position. When the transfer unit 740 is in the second inside position, the surface of the belt 41 that makes contact with the photosensitive drums 61 is positioned lower than the height Hd of the upper cover portion 20*b* of the door unit 20. A transfer unit abutment member 601, indicated by hatching, is located at one end in the depth direction of the transfer unit 740, so as not to interfere with other components when the transfer unit is pulled out of the second inside position, allowing the transfer unit to move to the second outside position. The transfer unit abutment member 601 makes contact only with the transfer unit support 602.

The transfer unit 740 can move horizontally when the tray unit 750 and the transfer unit 740 are shifted from the first and second inside positions to the first and second outside positions, respectively. The surface of the belt 41 making contact with the photosensitive drums 61 (belt surface 90) is always positioned lower than the height Hd of the upper cover portion 20*b* of the door unit 20.

Next, in FIG. 7, the tray unit 750 is in the first outside position, and the transfer unit 740 is in the second outside position. When the transfer unit 740 is in the second outside position, the belt 41 is positioned lower than the height Hd of the upper cover portion 20*b* of the door unit 20, so that the front surface of the belt 41 is covered and protected. When the tray unit 750 and the transfer unit 740 are pulled out, the transfer unit abutment member 601 and the transfer unit support 602, both indicated by hatching, contact with each other and serve as a stopper. The upper cover portion 20*b* of the door unit 20 having height Hd that is positioned higher than the surface of the belt 41 that makes contact with the photosensitive drums 61 allows the user to intuitively recognize that the transfer unit 740 will stop before the upper cover portion 20*b*.

Various embodiments of the present disclosure provide the effects of preventing users from touching the belt 41 as described above. Thus, contamination or damage to the belt 41 is prevented and the occurrence of troubles such as image defects can be minimized.

The transfer unit in the embodiments described above adopts an intermediate transfer belt as a transfer member. The present disclosure is not limited to this configuration and can be applied to belt units of other types such as those using an electrostatic transfer belt.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-037806, filed on Mar. 12, 2024, which is hereby incorporated by reference wherein in its entirety.

What is claimed is:

1. An image forming apparatus comprising:

a main body having an opening and configured to house a photosensitive drum;

a door unit connected to the main body and configured to be movable between a closed position where the door unit closes the opening and an open position where the door unit opens the opening;

a belt unit including a belt configured to contact with the photosensitive drum, the belt unit being configured to be moveable between inside and outside of the main body through the opening of the main body with the door unit being in the open position; and a tray unit configured to be moveable between inside and outside of the main body through the opening of the main body with the door unit being in the open position, the tray unit including a cartridge, and a tray on which the cartridge is removably mounted, one of the cartridge or the tray having the photosensitive drum, wherein the door unit, when in the open position, is configured to support the belt unit located outside of the main body, and wherein when the belt unit is outside of the main body, an upper end of the belt is positioned lower than an upper end of the door unit in a vertical direction, and wherein the belt unit is configured to move from inside to outside of the main body with the tray unit when the tray unit moves from inside to outside of the main body.

2. The image forming apparatus according to claim 1, wherein when the belt unit is outside of the main body and supported by the door unit in the open position, the upper end of the belt in the belt unit is positioned lower than the upper end of the door unit in the vertical direction.

3. The image forming apparatus according to claim 1, wherein the door unit includes a side cover portion covering at least a portion of a side face of the main body, and an upper cover portion covering at least a portion of an upper surface of the main body, and the door unit is configured to be movable between the closed position and the open position by turning about a rotation axis positioned below the opening in the vertical direction, and when the belt unit is outside of the main body, the upper end of the belt is positioned lower than an upper end of the upper cover portion in the vertical direction.

4. The image forming apparatus according to claim 3, further comprising a fixing apparatus, wherein when the door unit is in the closed position, the upper cover portion covers the fixing apparatus, and when the door unit is in the open position, the fixing apparatus is exposed.

5. The image forming apparatus according to claim 3, wherein the belt has a front surface in a downstream portion in a direction in which the belt unit moves from inside to outside of the main body, and the upper cover portion is configured to be always located upstream of the front surface of the belt when the door unit is in the open position.

6. The image forming apparatus according to claim 1, wherein when the belt unit moves from inside to outside of the main body, the upper end of the belt in the belt unit is always positioned lower than the upper end of the door unit in the vertical direction.

7. The image forming apparatus according to claim 1, wherein an upper end of a part of the belt unit is positioned higher than the upper end of the door unit in the vertical direction.

8. The image forming apparatus according to claim 7, wherein the part of the belt unit is a cleaner configured to clean the belt.

9. An image forming apparatus comprising:

a main body having an opening and configured to house a photosensitive drum;

a door unit connected to the main body and configured to be movable between a closed position where the door unit closes the opening and an open position where the door unit opens the opening;

a belt unit including a belt configured to contact with the photosensitive drum, the belt unit being configured to be moveable between inside and outside of the main body through the opening of the main body with the door unit being in the open position; and a tray unit configured to be moveable between inside and outside of the main body through the opening of the main body with the door unit being in the open position, the tray unit including a cartridge, and a tray on which the cartridge is removably mounted, one of the cartridge or the tray having the photosensitive drum, wherein the door unit, when in the open position, is configured to support the belt unit located outside of the main body, and wherein when the belt unit is outside of the main body, an upper end of the belt is positioned lower than an upper end of the door unit in a vertical direction, and wherein an upper end of a part of the belt unit is positioned higher than the upper end of the door unit in the vertical direction.

10. The image forming apparatus according to claim 9, wherein when the belt unit is outside of the main body and supported by the door unit in the open position, the upper end of the belt in the belt unit is positioned lower than the upper end of the door unit in the vertical direction.

11. The image forming apparatus according to claim 9, wherein the door unit includes a side cover portion covering at least a portion of a side face of the main body, and an upper cover portion covering at least a portion of an upper surface of the main body, and the door unit is configured to be movable between the closed position and the open position by turning about a rotation axis positioned below the opening in the vertical direction, and when the belt unit is outside of the main body, the upper end of the belt is positioned lower than an upper end of the upper cover portion in the vertical direction.

12. The image forming apparatus according to claim 11, further comprising a fixing apparatus, wherein when the door unit is in the closed position, the upper cover portion covers the fixing apparatus, and when the door unit is in the open position, the fixing apparatus is exposed.

13. The image forming apparatus according to claim 11, wherein the belt has a front surface in an downstream portion in a direction in which the belt unit moves from inside to outside of the main body, and the upper cover portion is configured to be always located upstream of the front surface of the belt when the door unit is in the open position.

14. The image forming apparatus according to claim 9, wherein when the belt unit moves from inside to outside of the main body, the upper end of the belt in the belt unit is always positioned lower than the upper end of the door unit in the vertical direction.

15. The image forming apparatus according to claim 9, wherein the part of the belt unit is a cleaner configured to clean the belt.

* * * * *